United States Patent [19]

Aihara et al.

[11] Patent Number: 5,094,420
[45] Date of Patent: Mar. 10, 1992

[54] POWER SEAT SLIDE DEVICE

[75] Inventors: Tsutomu Aihara; Junichi Maekawa, both of Yokohama City, Japan

[73] Assignee: Ohi Seisakusho Co., Ltd., Yokohama City, Japan

[21] Appl. No.: 399,562

[22] Filed: Aug. 24, 1989

[30] Foreign Application Priority Data

Aug. 29, 1988 [JP] Japan .................. 63-212359
Dec. 5, 1988 [JP] Japan .................. 63-305966

[51] Int. Cl.⁵ ........................... B60N 1/08
[52] U.S. Cl. ........................ 248/430; 248/419
[58] Field of Search ............ 248/430, 429, 419, 422, 248/420

[56] References Cited

U.S. PATENT DOCUMENTS

| | | | |
|---|---|---|---|
| 3,491,979 | 1/1970 | Wonell | 248/430 |
| 4,364,536 | 12/1982 | Kluting | 248/429 |
| 4,556,263 | 12/1985 | Chevalier | 248/430 X |
| 4,720,073 | 1/1988 | Mann et al. | 248/430 |
| 4,863,289 | 9/1989 | Lecerf | 248/430 X |

FOREIGN PATENT DOCUMENTS 64-60445  3/1989  Japan .
2193630  2/1988  United Kingdom ............... 248/429

Primary Examiner—Alvin C. Chin-Shue
Attorney, Agent, or Firm—Foley & Lardner

[57] ABSTRACT

Disclosed herein is a power seat slide device which comprises a stationary rail member; a movable rail member axially slidably engaged with the stationary rail member, the movable rail member having an anchor portion to which an end of a seat belt is connected; a rack member extending along and secured to the stationary rail member having an axially extending slit defined therebetween; a pinion meshed with the rack member; a drive device mounted on the movable rail member to drive the pinion; and an embracing structure connected to the movable rail member and embracing the rack member in a manner to constitute a slidably interlocking connection therebetween, the embracing structure having opposed end portions by which the pinion is rotatably held, one of the opposed portions being passed through the axially extending slit.

12 Claims, 5 Drawing Sheets

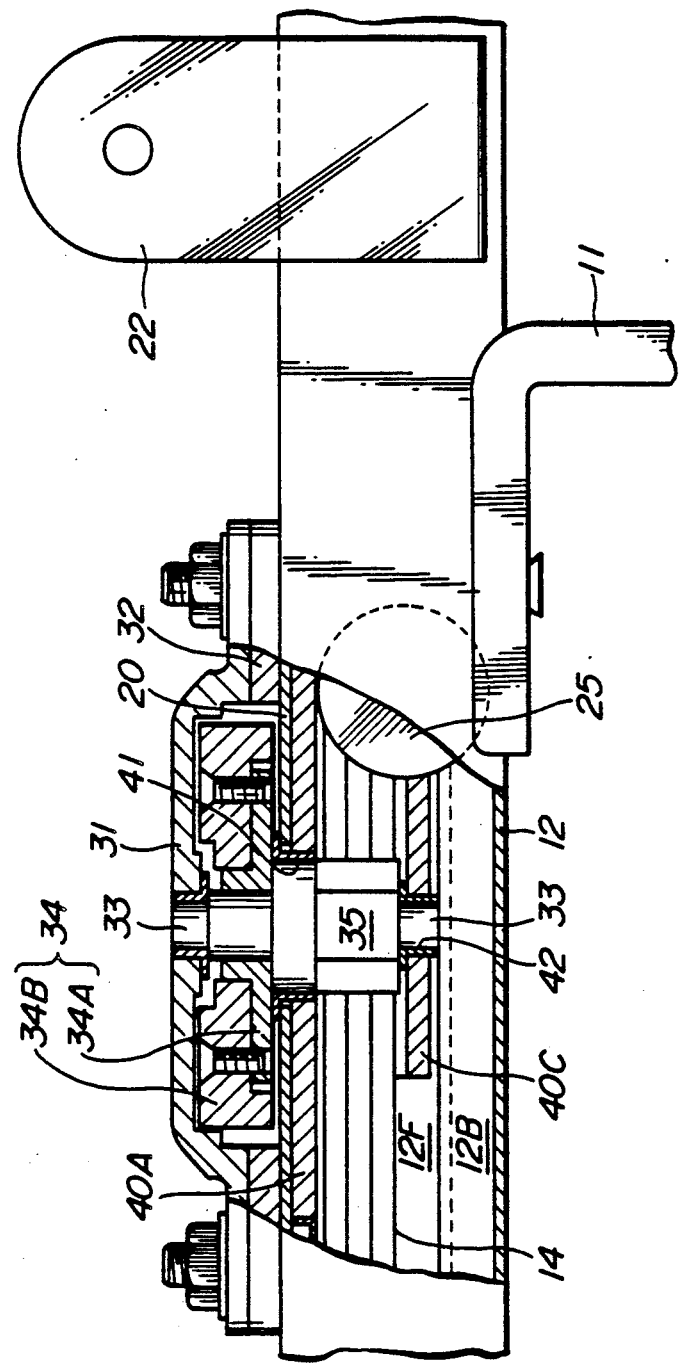

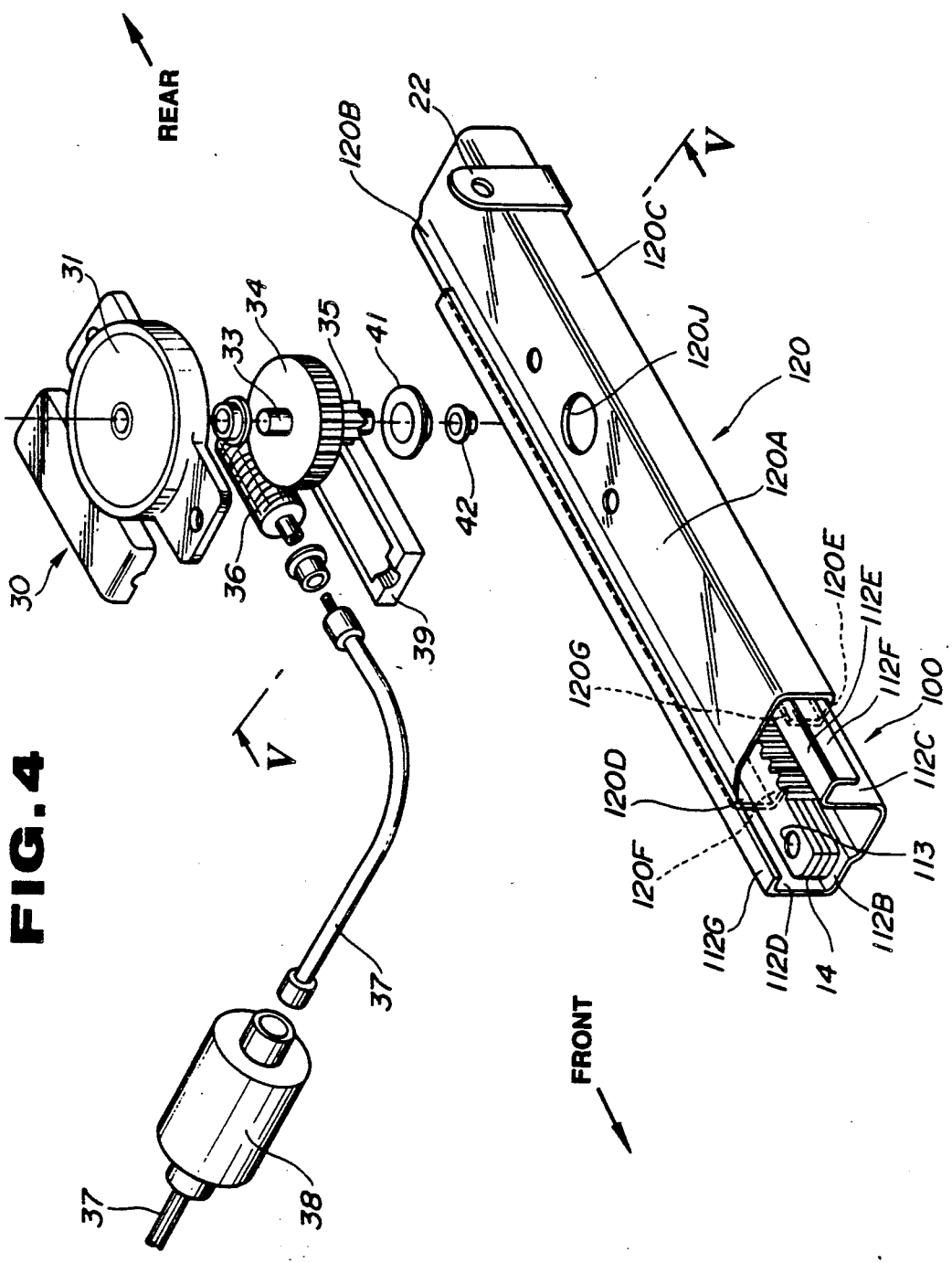

POWER SEAT SLIDE DEVICE

BACKGROUND OF THE INVENTION

1. Field of the Invention

The present invention relates in general to power seat slide devices, and more particularly, to power seat slide devices of a so-called "belt-in" type used for an automotive seat which has a seat belt anchored to a rear end portion thereof.

2. Description of the Prior Art

Power seat slide devices widely used nowadays are of a type which comprises generally a rack fixed to a stationary rail, a pinion meshed with the rack and operatively held by a movable rail which is slidably disposed on the stationary rail, and an electric motor for driving the pinion through a flexible wire. When the motor is energized, the pinion is driven and thus moves the movable rail on and along the stationary rail. With this, the seat mounted on the movable rail is moved to a desired fore-and-aft position.

In case of the "belt-in" type, the movable rail has at its rear end a belt anchor portion to which an end of a seat belt is fixed. Thus, upon a vehicle collision, a big stress is suddenly applied to the belt anchor portion of the movable rail by a belt wearer on the seat. This requires the necessity of assuring the locked connection between the movable and stationary rails. In fact, if the locked connection is poor, the movable rail may get off the stationary rail upon the vehicle collision. Of course, this is very dangerous.

In order to solve such dangerous phenomenon, the same inventors have proposed a measure which is disclosed in Japanese Patent First Provisional Publication 64-60445.

As is shown in FIG. 7 of the accompanying drawings, in the measure of the publication, the stationary rail is constructed of two overlapped elongate members, which are a first elongate stationary rail member 1 having somewhat raised side flanges 1A and a second elongate stationary rail member 2 having a generally C-shaped cross section. The movable rail is constructed of two overlapped elongate members, which are a first elongate movable rail member 3 having embracing side portions which slidably embrace the side flanges 1A of the first elongate stationary rail member 1 and a second elongate movable rail member 4 having embracing side portions which slidably embrace the side wall portions of the second elongate stationary rail member 2.

Upper and lower case members 5 and 6 are connected to the movable rail in a manner to put therebetween the stationary rail.

The two-ply stationary rail is formed with an axially extending slot 1B. One side edge of the slot 1B is formed with a plurality of teeth 1C. A pinion 8 is meshed with the teeth 1C and is rotatably carried by the upper and lower case members 5 and 6 through a pinion shaft 7.

With the robust construction possessed by the two-ply stationary rail and the fully embracing type movable rail, the dangerous phenomenon, viz., the disengagement of the movable rail from the stationary rail, is suppressed.

However, this time, the power seat slide device of the publication has the following drawbacks.

That is, first, the robust construction of the stationary and movable rails causes results in an increase in production costs of the seat slide device. Furthermore, because of necessity of structural precision, the lower case member 6 must be constructed of die casting, which promotes the cost increase. Furthermore, for the purpose of assuring the meshed engagement between the pinion 8 and the teeth 1C of the two-ply stationary rail, it is necessary to enlarge the size of the pinion 8 to a certain degree. However, this causes bulky and heavy construction of the seat slide device.

SUMMARY OF THE INVENTION

It is therefore an object of the present invention to provide a power seat slide device which is free of the above-mentioned drawbacks.

According to the present invention, there is provided a power seat slide device which comprises a stationary rail member; a movable rail member axially slidably engaged with the stationary rail member, the movable rail member having an anchor portion to which an end of a seat belt is connected; a rack member extending along and secured to the stationary rail member having an axially extending slit defined therebetween; a pinion meshed with the rack member; a drive device mounted on the movable rail member to drive the pinion; an embracing structure embracing the rack member in a manner to constitute a slidably interlocking connection therebetween, the embracing structure having opposed end portions by which the pinion is rotatably held, one of the opposed portions being passed through the axially extending slit; and connecting means for connecting the embracing structure to the movable rail.

BRIEF DESCRIPTION OF THE DRAWINGS

Other objects and advantages of the present invention will become apparent from the following description when taken in conjunction with the accompanying drawings, in which:

FIG. 3 is a partially sectioned side view of an essential part of the power seat slide device of the first embodiment;

FIG. 4 is an exploded perspective view of a power seat slide device, which is a second embodiment of the present invention;

DETAILED DESCRIPTION OF THE INVENTION

Figure 1:
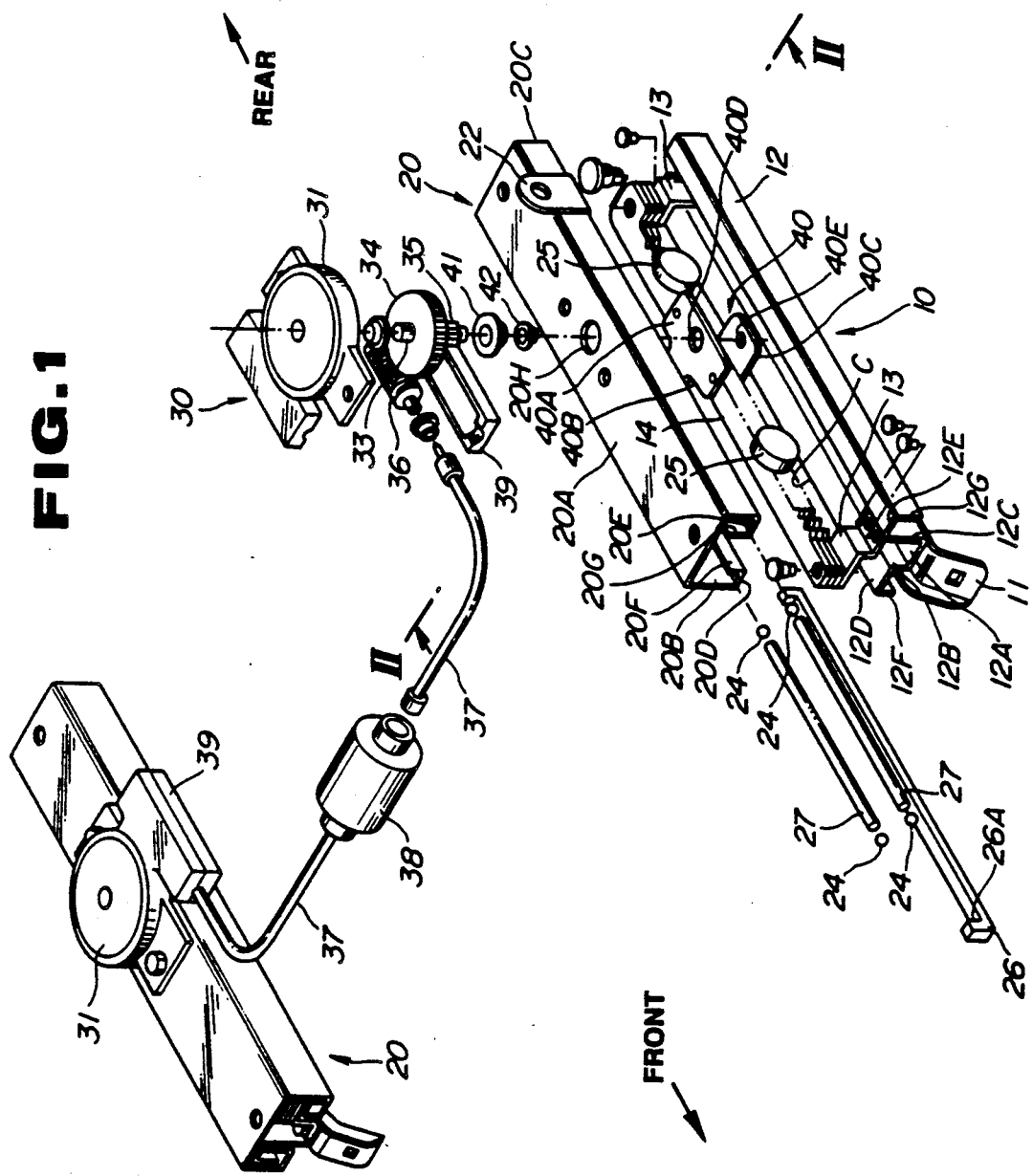
FIG. 1 is an exploded perspective view of a power seat slide device, which is a first embodiment of the present invention.
Figure 2:
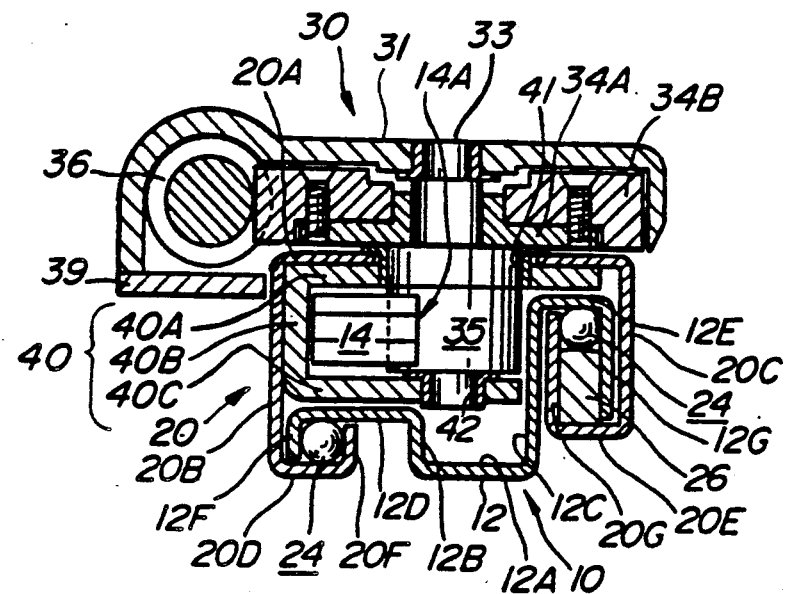
FIG. 2 is an enlarged sectional view taken along the line II—II, of FIG. 1.
Figure 7:
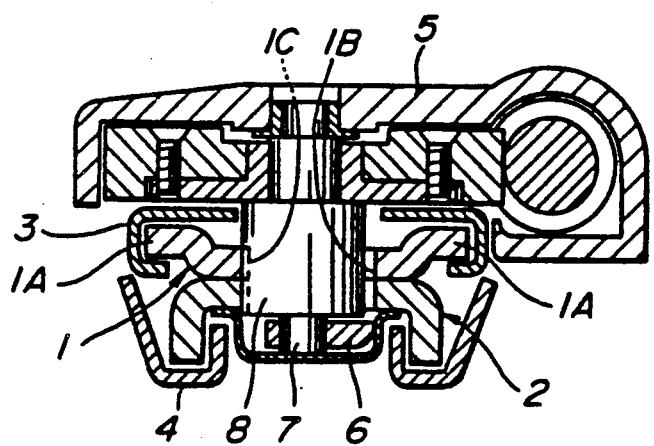
FIG. 7 is a sectional view of a conventional power seat slide device.

Referring to FIGS. 1 to 3, there is shown a power seat slide device, which is a first embodiment of the present invention.

In the drawings, denoted by numeral 10 is a stationary rail unit which is secured to a vehicle floor (not shown) through front and rear brackets 11. As will become apparent as the description proceeds, the stationary rail unit comprises generally a stationary rail member 12 and a coaxially extending rack member 14. The rack member 14 is secured to the stationary rail member 12 by front and rear brackets 13 with an axially extending slit "C" defined therebetween.

As is seen from FIG. 2, the stationary rail member 12 is of a channel structure, which comprises a bottom wall portion 12A, first and second side wall portions 12B and 12C which vertically upwardly extend from both sides of the bottom wall portion 12A, first and second upper wall portions 12D and 12E which extend outwardly horizontally from upper ends of the first and second side wall portions 12B and 12C respectively, and third and fourth side wall portions 12F and 12G which extend downwardly vertically from outer ends of the first and second upper wall portions 12D and 12E. As is shown, for compactly mounting the rack member 14 on the stationary rail member 12, the first and third side wall portions 12B and 12F are constructed smaller than the second and fourth side Wall portions 12C and 12G respectively.

Designated by numeral 20 is a movable rail member which is slidably engaged with the lower rail member 12. As is seen from FIG. 2, the movable rail member 20 comprises an upper flat wall portion 20A to which a seat (not shown) is secured, first and second side wall portions 20B and 20C which extend vertically downwardly from both sides of the upper flat wall portion 20A, first and second lower wall portions 20D and 20E which extend horizontally inwardly from lower ends of the first and second side wall portions 20B and 20C respectively and third and fourth side wall portions 20F and 20G which extend vertically upwardly from inward ends of the first and second lower wall portions 20D and 20E respectively. In order to match with the above-mentioned stationary rail member 12, the first and fourth side wall portions 20B and 20G of the movable rail member 20 are constructed larger than the second and third side wall portions 20C and 20E respectively.

As is seen from the drawings, upon proper coupling of the stationary and movable rail members 12 and 20, the first upper wall portion 12D and the third side wall portion 12F of the stationary member 12 and the first lower wall portion 20D and the third side wall portion 20F of the movable rail member 20 constitute a so-called first slidably interlocking structure, and at the same time, the second upper wall portion 12E and the fourth side wall portion 12G of the stationary rail member 12 and the second lower wall portion 20E and the fourth side wall portion 20G of the movable rail member 20 constitute a second slidably interlocking structure.

As is seen from FIG. 1, the movable rail member 20 has at its rear portion an anchor bracket 22 which is welded to the second side wall portion 20C of the rail member 20. Although not shown in the drawing, an end of a seat belt is connected to the anchor bracket 22.

Two rollers 25 are rotatably disposed between the stationary and movable rail members 12 and 20, each roller 25 being in contact with the bottom wall portion 12A of the stationary rail member 12 and the upper flat wall portion 20A of the movable rail member 20. Two ball bearings 24 are rotatably disposed in the above-mentioned first slidably interlocking structure, and the other two ball bearings 24 and an elongate spacer 26 are disposed in the second slidably interlocking structure. As is seen from FIG. 1, the elongate spacer 26 has an axially extending groove 26A on and along which the ball bearings 24 run. The two ball bearings 24 in each slidably interlocking structure are axially spaced by a spacer rod 27.

Designated by numeral 30 is a drive device for driving the seat (not shown) in fore-and-aft direction. The drive device 30 comprises a case 31 secured through a spacer 32 (see FIG. 3) to the upper flat wall portion 20A of the movable rail member 20. A drive shaft 33 rotatably supported by the case 31 has a worm wheel 34 secured thereto. As is seen from FIG. 3, the worm wheel 34 comprises a base portion 34A and a toothed portion 34B which are coaxially connected by bolts (no numerals). The drive shaft 33 has further a pinion 35 secured thereto. The pinion 35 is projected into an inner space defined by the stationary and movable rail members 12 and 20. For this projection, the upper flat wall portion 20A of the movable rail member 20 is formed with an opening 20H, as is seen in FIG. 1. Upon proper assembly, the pinion 35 is meshed with teeth 14A of the afore-mentioned rack member 14. A worm 36 is rotatably supported by the case 31 and operatively engaged with the worm wheel 34. The worm 36 is driven in one and the other directions by an electric motor 38 through a flexible wire 37. A lower cover 39 is arranged to cover a lower half of the worm 36.

Designated by numeral 40 (see FIGS. 1-3 is an embracing member of a metal, such as steel or the like, which is secured to an inner surface of the upper flat wall portion 20A of the movable rail member 20 in a manner to substantially embrace the rack member 14. As may be understood from FIG. 1, both the embracing member 40 and the above-mentioned case 31 of the drive device 30 are connected to the movable rail member 20 by common bolts and nuts.

The embracing member 40 has a generally U-shaped structure, which comprises an upper wall portion 40A extending horizontally over the rack member 14, a side wall portion 40B positioned beside the rack member 14 and a lower wall portion 40C passing through the slit "C". As illustrated in FIG. 2, member 40B is arranged opposed and adjacent to the first side wall potion 20B of movable rail member 20. Thus, a so-called "slidably interlocking connection" is established between the rack member 14 and the embracing member 40. It is however to be noted that under a normal condition, there is no contact between the embracing member 40 and the rack member 14. However, for the reason which will become apparent as the description proceeds, the side wall portion 40B is separated from the back side of the rack member 14 with a very small clearance therebetween. The upper and lower wall portions 40A and 40C are formed at their inwardly projected end portions with aligned openings 40D and 40E respectively.

The openings 40D of the upper wall portion 40A is mated with the afore-mentioned opening 20H of the movable rail member 20, and these mated openings are equipped with a common bush 41. The opening 40E of the lower wall portion 40C is equipped with another bush 42. These bushes 41 and 42 rotatably hold the drive shaft 33 of the drive device 30 having the pinion 35 put therebetween.

When, in operation, the electric motor 38 is energized, the worm wheel 34 is rotated at a reduced rotation speed and the pinion 35 meshed with the rack member 14 is rotated through the drive shaft 33. Thus, the movable rail member 20, together with the seat (not shown) mounted thereon, is moved forward or rearward relative to the stationary rail member 12. When the energization of the electric motor 38 is ceased, the movement of the movable rail member 20 stops. Under this stop condition, the movable rail member 20 is substantially locked to the stationary rail member 12 due to the nature of the engagement between the worm 36 and the worm wheel 34.

When the vehicle encounters a vehicle collision or the like, an abnormally large stress is suddenly applied to the anchor bracket 22 by a belt wearer on the seat.

The stress substantially consists of first and second components, the first component being a component for pushing the movable rail member 20 forward relative to the stationary rail member 12, and the second component being a component for pushing the movable rail member 20 upward relative to the stationary rail member 12.

When, due to the work of the first component, the movable rail member 20 is pushed forward, the rack member 14 and the pinion 35 are stressed to move in laterally opposed directions to break the meshed engagement therebetween. However, the movement of the rack member 14 is prevented by the side wall portion 40B of the embracing member 40 and the movement of the pinion 35 is prevented by the upper and lower wall portions 40A and 40C of the embracing member 40. As has been described hereinabove, since the side wall portion 40B of the embracing member 40 is positioned close to the back side of the rack member 14, the movement of the rack member 14 instantly brings about the contact of the side wall portion 40B with the rack member 14. Thus, the breakage of the meshed engagement between the rack member 14 and the pinion 35 is suppressed.

When, due to the work of the second component, the movable rail member 20 is pushed upward, the aforementioned first and second slidably interlocking structures possessed by the stationary and movable rail members 12 and 20 prevent the undesired disengagement of the movable rail member 20 from the stationary rail member 12. It is to be noted that the embracing member 40 promotes the assured coupling of the two rail members 12 and 20 under such severe condition. In fact, when, due to a vehicle collision, the movable rail member 20 is raised from the stationary rail member 12, the lower wall portion 40C of the embracing member 40 is brought into abutment with the lower face of the rack member 14 to obstruct such raising.

Since the embracing member 40 can be constructed of an inexpensive stamped steel plate, the provision of the same does not cause a substantial increase in production cost of the power seat slide device. Furthermore, since the provision of the embracing member 40 assures a reliable engagement between the stationary and movable rail members 12 and 20 even in a vehicle collision, the mechanical strength required by the other parts can be somewhat reduced. Thus, a light weight and compact structure is available in the invention.

Figure 5:
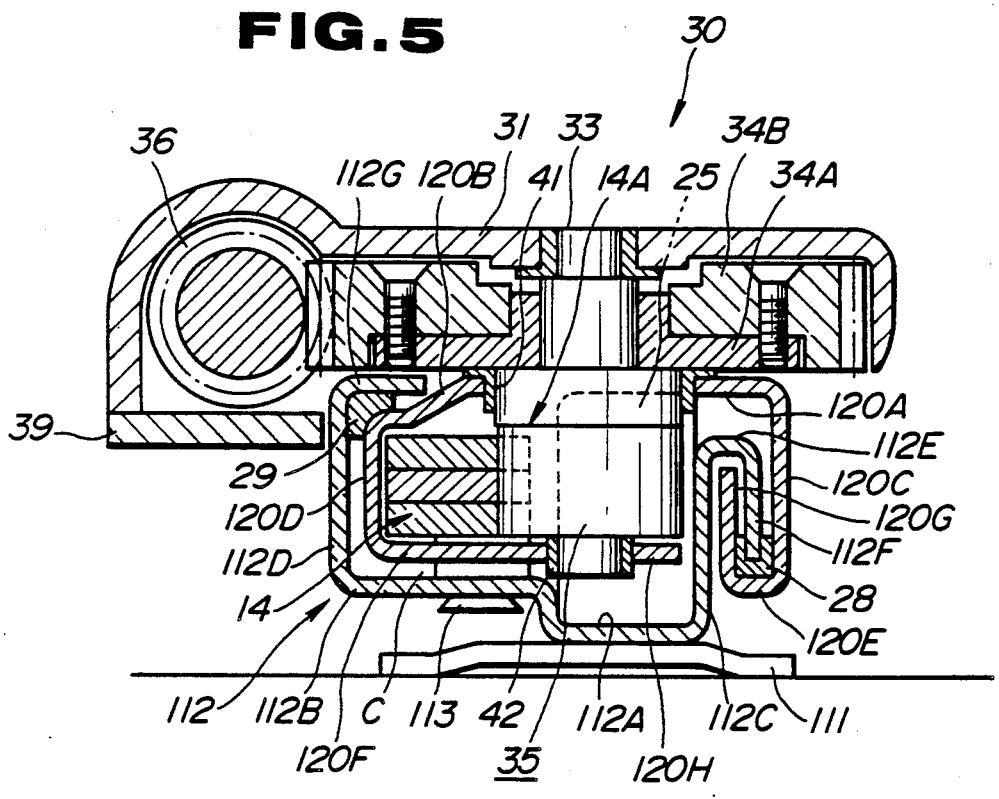
FIG. 5 is an enlarged sectional view taken along the line V—V of FIG. 4.
Figure 6:
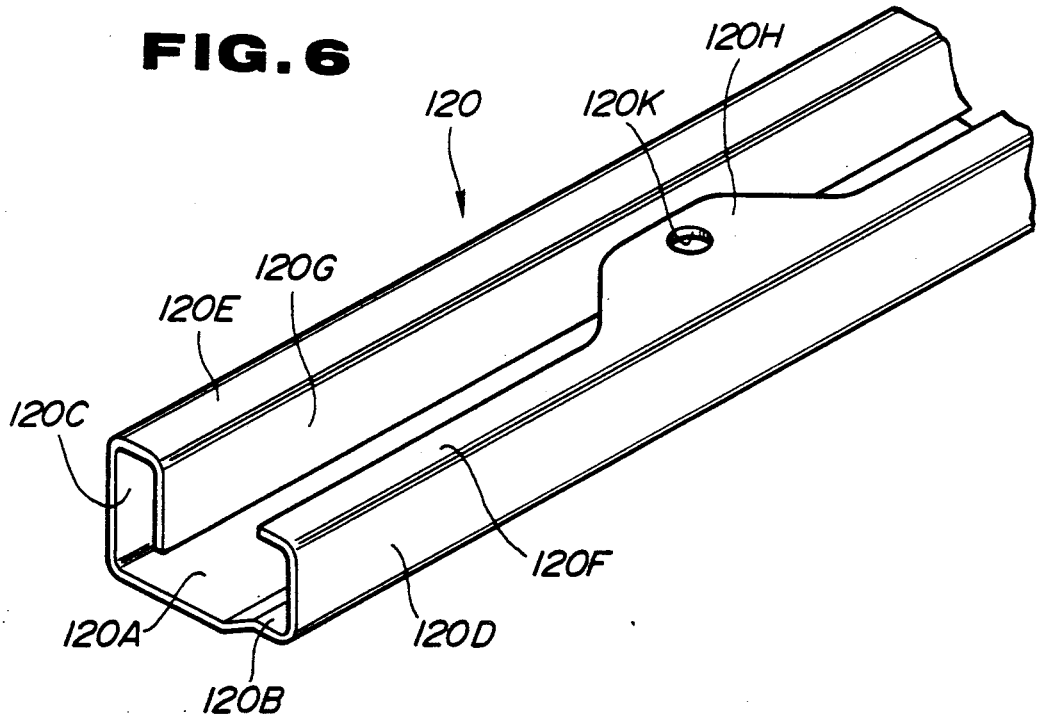
FIG. 6 is a perspective, but upside-down, view of a movable rail employed in the second embodiment.

Referring to FIGS. 4 to 6, there is shown a power seat slide device, which is a second embodiment of the present invention.

As will become apparent as the description proceeds, in the second embodiment, the means corresponding to the embracing member 40 of the first embodiment is defined by the movable rail member per se. Thus, the power seat slide device in the second embodiment can be constructed to be relatively simple, compact and light.

For ease of description, parts and constructions substantially identical to those in the afore-mentioned first embodiment will be denoted by the same numerals, and detailed explanation of them will be omitted from the following.

In the drawings, denoted by numeral 100 is a stationary rail unit which is secured to a vehicle floor (not shown) through front and rear brackets 111 (see FIG. 5). The stationary rail unit 100 comprises generally a stationary rail member 112 and a coaxially extending rack member 14. The rack member 14 is secured to the stationary rail member 112 by studs 113 with an axially extending slit "C" (see FIG. 5) defined therebetween.

As is seen from FIG. 5, the stationary rail member 112 is of a channel structure, which comprises first and second lower wall portions 112A and 112B which are united through a stepped portion (no numeral), first and second side wall portions 112C and 112D which extend vertically upwardly from respective outer ends of the first and second lower wall portions 112A and 112B, first and second upper wall portions 112E and 112G which extend horizontally from upper ends of the first and second side wall portions 112C and 112D, and a third side wall portion 112F which extends downwardly vertically from the outer end of the first upper wall portion 112E. It is to be noted that the rack member 14 is secured to the second lower wall portion 112B, and the first and second upper wall portions 112E and 112G extend in the same direction, that is, rightward in FIG. 5.

Designated by numeral 120 is a movable rail member which is slidably engaged with the stationary rail member 112.

As is seen from FIG. 5, the movable rail member 120 comprises an upper flat wall portion 120A to which a seat (not shown) is secured, an upper inclined wall portion 120B integral with the flat wall portion 120A, first and second side wall portions 120C and 120D which extend vertically downwardly from respective outer ends of the flat and inclined upper wall portions 120A and 120B, first and second lower wall portions 120E and 120F which extend horizontally inwardly from lower ends of the first and second side wall portions 120C and 120D, and a third side wall portion 120G which extends vertically upwardly from an inward end of the first lower wall portion 120E.

As is seen from FIG. 6, the second lower wall portion 120F is integrally formed with an enlarged lug 120H which extends inwardly. The lug 120H is formed with an opening 120K.

As is seen from FIG. 4, the upper flat wall portion 120A of the movable rail member 120 is formed with an opening 120J. It is to be noted that the opening 120J of the upper flat wall portion 120A and the opening 120K of the lug 120H are aligned.

As is seen from FIG. 5, upon proper coupling of the stationary and movable rail members 112 and 120, the wall portions 112C, 112E and 112F of the stationary rail member 112 and the wall portions 120C, 120E and 120G of the movable rail member 120 constitute a first slidably interlocking structure, and at the same time, the wall portions 112B, 112D and 112G of the stationary rail member 112 and the wall portions 120B, 120D and 120F of the movable rail member 120 constitute a second slidably interlocking structure. Under this coupling condition, the second lower wall portion 120F of the movable rail member 120 is passed through the slit "C" having the lug 120H exposed to the internal space defined between the stationary and movable rail members 112 and 120.

Similar to the first embodiment, two rollers are operatively disposed between the stationary and movable rail members 112 and 120, each roller 25 being in with the first lower wall portion 112A of the stationary rail member 112 and the upper flat wall portion 120A of the movable rail member 120.

As is seen from FIG. 5, first and second slide bearings 28 and 29 are operatively disposed in the slidably interlocking structures. More specifically, the first slide bearing 28 is disposed between the leading end of the third side wall portion 112F of the stationary rail member 112 and a channel structure which includes the first lower wall portion 120E and the first and third side wall portions 120C and 120G of the movable rail member 120, and the second slide bearing 29 is disposed between a channel structure defined by both the second side wall portion 112D and the second upper wall portion 112G of the stationary rail member 112 and a shoulder portion defined by both the inclined upper wall portion 120B and the second side wall portion 120D of the movable rail member 120.

The openings 120J and 120K of the movable rail member 120 are equipped with respective bushes 41 and 42 by which a drive shaft 33 from a worm wheel 34 is rotatably held having a pinion 35 put between the upper flat wall portion 120A and the lug 120H. The pinion 35 is meshed with the rack member 14.

As will be understood from FIG. 5, upon proper assembly, the second side wall portion 120D of the movable rail member 120 is separated from the back side of the rack member 14 with a very small clearance therebetween.

When, in operation, the electric motor 38 is energized, the worm wheel 34 is rotated. Thus, the movable rail member 120 is moved forward or rearward, together with the seat mounted thereon, relative to the stationary rail member 112. When the energization of the motor 38 is ceased, the movement of the movable rail member 120 is stopped and thereupon the movable rail member 120 becomes substantially locked to the stationary rail member 112 due to the nature of the engagement between the worm 36 and the worm wheel 34.

When, due to a vehicle collision or the like, a big stress is suddenly applied to the anchor bracket 22 by a belt wearer on the seat, and thus the movable rail member 112 is pushed forward, the rack member 14 and the pinion 35 are stressed to move in laterally opposed directions to break the meshed engagement therebetween. However, the lateral movement of the rack member 14 is prevented by an abutment which instantly takes place between the second side wall portion 120D of the movable rail member 120 and the back side of the rack member 14 and the lateral movement of the pinion 35 is prevented by the upper flat wall portion 120A and the lug 120H of the movable rail member 120, like in the case of the afore-mentioned first embodiment.

Because the device of this second embodiment has no separate part corresponding to the embracing member 40 employed in the above-mentioned first embodiment, there is no necessity of providing the assembly of the stationary and movable rail members 112 and 120 with a space for receiving such embracing member. Accordingly, the rail assembly can be made much compact, simple and light in construction as compared with that of the first embodiment.

What is claimed is:

1. A power seat slide device comprising;
   a stationary rail member;
   a movable rail member axially slidably engaged with said stationary rail member, said movable rail member having an anchor portion to which an end of a seat belt is connected, said movable rail member comprising an upper wall portion and side wall portions which extend downwardly from both sides of said upper wall portion;
   a rack member extending along and secured to said stationary rail member and having an axially extending slit defined therebetween, said rack member having a first, toothed side which faces laterally with respect to said power seat device and a second side which opposes said first side;
   a pinion meshed with said rack member, said pinion being arranged laterally beside said first side of said rack members;
   a drive device mounted on said movable rail member to drive said pinion;
   an embracing structure embracing said rack member and constituting a slidably interlocking connection between said stationary rail member and said movable rail member, said embracing structure having first and second opposed end portions by which said pinion is rotatably held and a third portion uniting said first end portion with said second end portion, said first end portion being passed through said axially extending slit, said second end portion extending across an upper face of said rack member and being directly secured to an inner surface of said movable rail member, said third portion being positioned between said second side of said rack member and one of said side wall portions of said movable rail member; and
   connecting means for directly connecting said second end portion of said embracing structure to said movable rail.

2. A power slide device as claimed in claim 1, in which said embracing structure includes said first and second opposed end portions and said third portion which are united to constitute a generally U-shaped structure, said third portion being separated from said rack member with a very small clearance defined therebetween.

3. A power seat slide device as claimed in claim 2, in which said embracing structure has no portions which are in contact with said rack member.

4. A power seat slide device as claimed in claim 3, in which said connecting means comprises bolts.

5. A power seat slide device as claimed in claim 1, in which said stationary and movable rail members are slidably interlocked through two slidably interlocking structures, each being constituted by side wall portions of said stationary rail members and side wall portions of said movable rail members.

6. A power seal slide device comprising:
   a stationary rail member;
   a movable rail member axially slidably engaged with said stationary rail member, said movable rail member having an anchor portion to which an end of a seal belt is connected, an upper wall portion, and side wall portions which extend downwardly from both lateral sides of said upper wall portion;
   rollers interposed between said stationary and movable rail members to smooth forward and rearward movement of said movable rail member relative to said stationary rail member;

a rack member extending along and secured to said stationary rail member with an axially extending slit defined therebetween, said rack member having a first, toothed side which faces laterally and a second side which opposes said first side;

a pinion which is meshed with said rack member, said pinion being located laterally beside said first side of said rack member;

a drive device mounted on said movable rail member to drive said pinion;

an embracing structure having a generally U-shaped structure which comprises a first wall portion which passes through said axially extending slit, a second wall portion which extends across an upper face of said rack member and which is secured to an inner surface of said movable rail member, and a third wall portion which is positioned close to an outer side surface of said rack member, said first and second wall portions having at their leading ends respective openings, said third wall portion being positioned between said second side of said rack member and one of said side wall portions of said movable member; and bushes respectively mounted to the openings of said first and second wall portions to rotatably hold a shaft portion of said pinion.

7. A power seat slide device as claimed in claim 6, in which said movable rail member is formed with an opening which is mated with the opening of said second wall portion of the embracing structure.

8. A power seat slide device as claimed in claim 7, in which said rack member is secured to said stationary rail member by means of front and rear brackets.

9. A power seat slide device as claimed in claim 8, in which said rack member is mounted on a depressed portion of said stationary rail member.

10. A power seat slide device as claimed in claim 9, in which said drive device comprises a worm wheel coaxially connected to said pinion; a worm operatively engaged with said worm wheel; and an electric power device which drives said worm through a flexible wire.

11. A power seat slide device as claimed in claim 10, in which said stationary and movable rail members are slidably interlocked through two slidably interlocking structures each being constituted by flanged side wall portions of said stationary and movable rail members.

12. A power seat slide device as claimed in claim 11, in which one of said slidably interlocking structures has a height less than the other.

* * * * *